Figure 1:
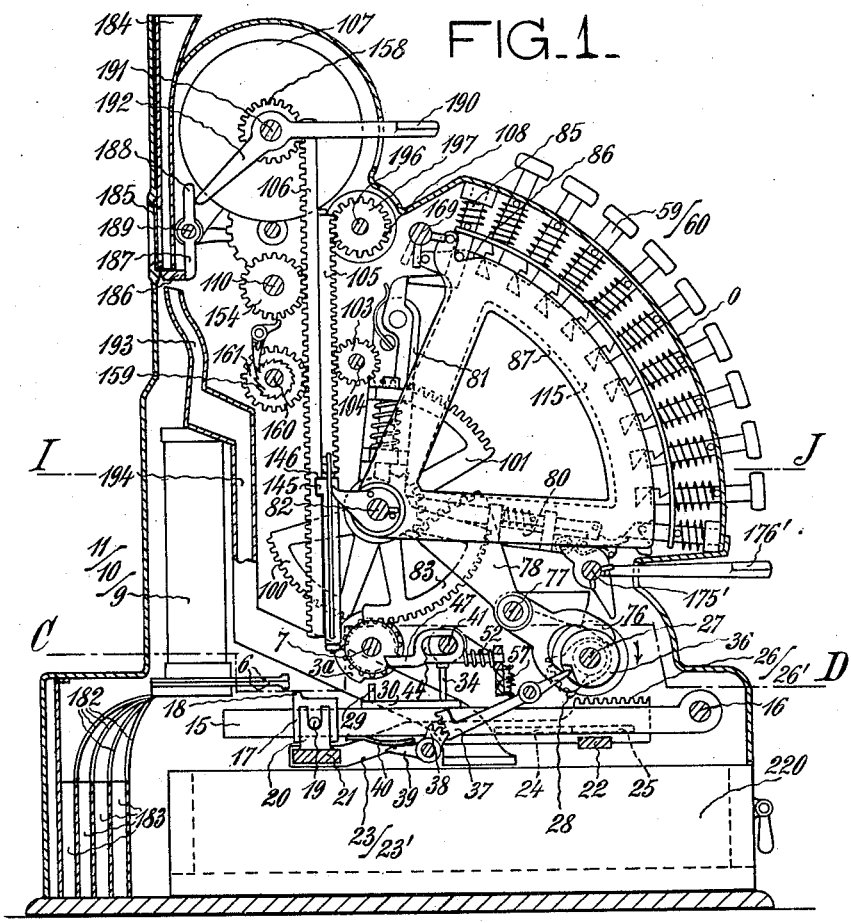

E. JANIK.
CASH CONTROLLING AND REGISTERING AND CHANGE RETURNING APPARATUS.
APPLICATION FILED SEPT. 22, 1908.

952,526.

Patented Mar. 22, 1910.
8 SHEETS—SHEET 1.

WITNESSES:
W. H. Berrigan.
Alfred R. Anderson.

INVENTOR,
EDUARD JANIK,
by H. van Oldenneel
Attorney.

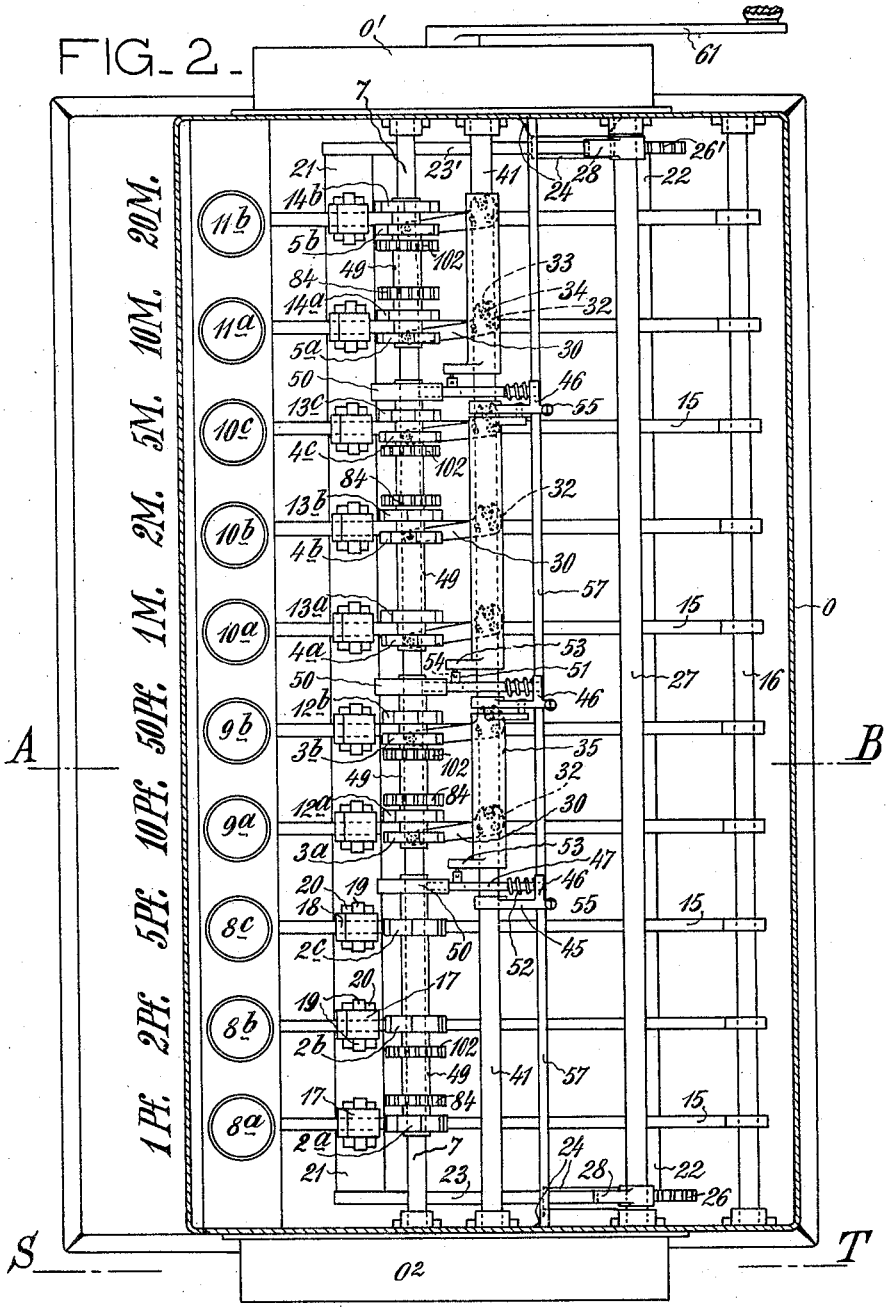

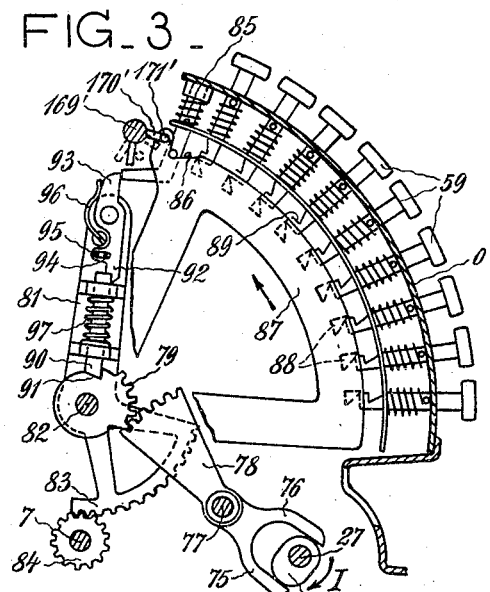
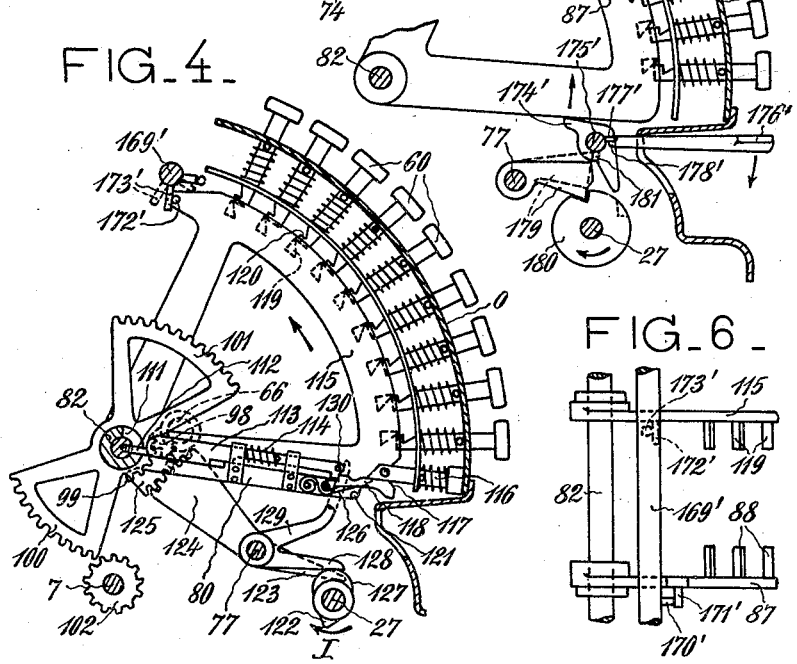

E. JANIK.
CASH CONTROLLING AND REGISTERING AND CHANGE RETURNING APPARATUS.
APPLICATION FILED SEPT. 22, 1908.
952,526.
Patented Mar. 22, 1910.
8 SHEETS—SHEET 4.
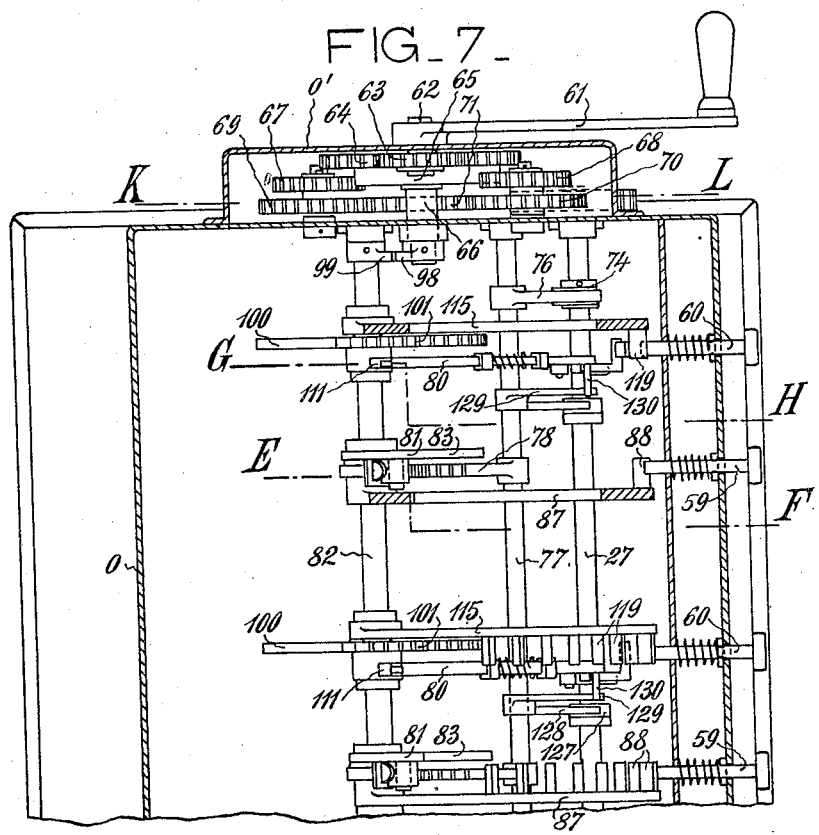
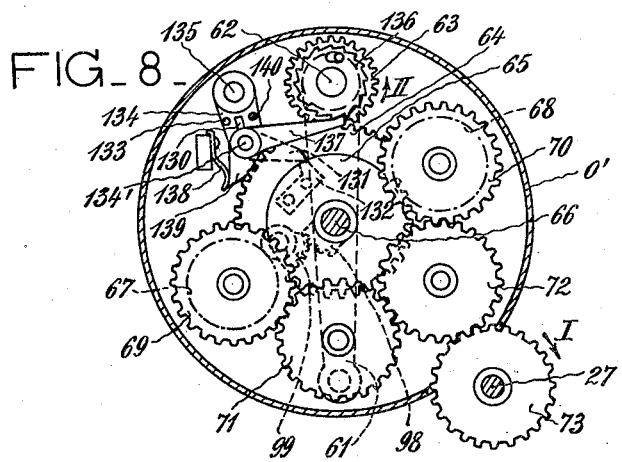
WITNESSES:
INVENTOR,
EDUARD JANIK,
by
ATTORNEY.

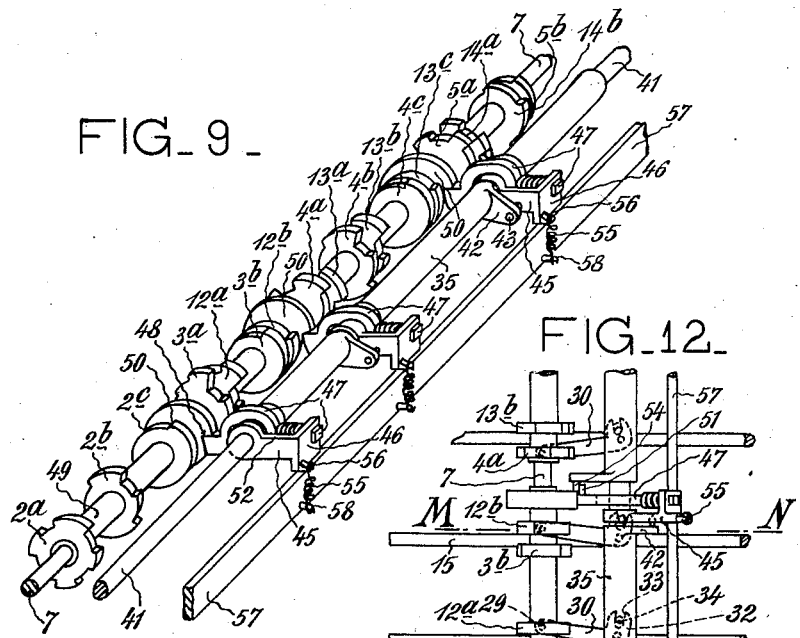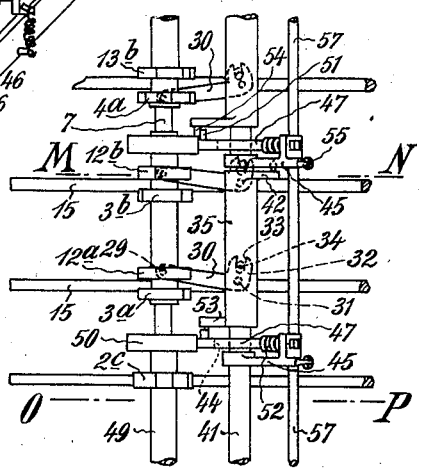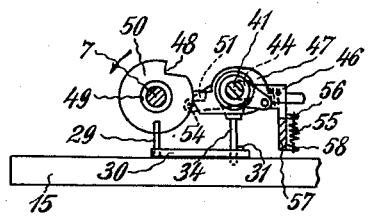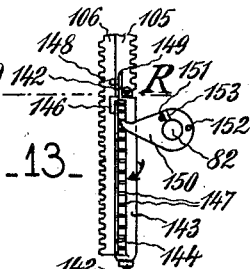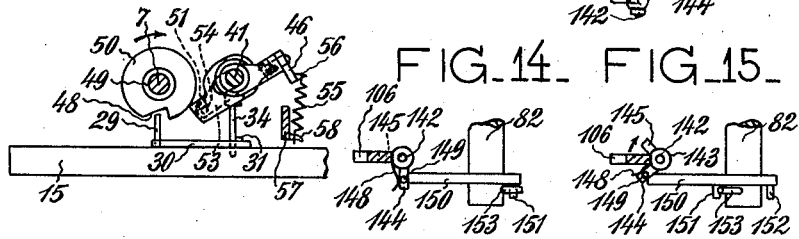

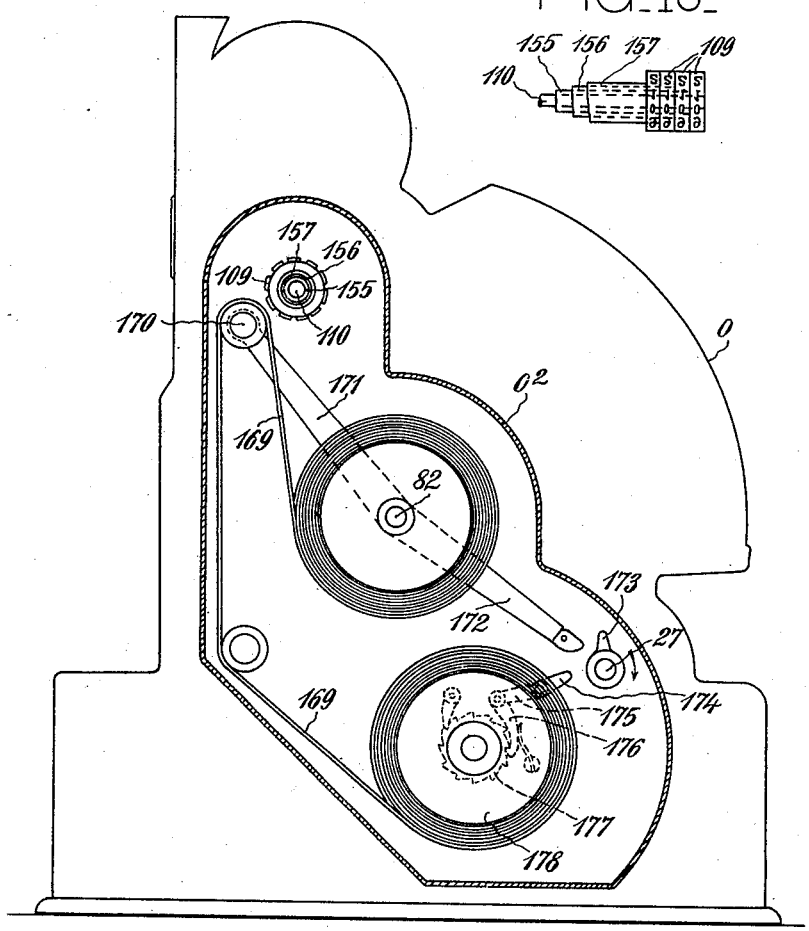
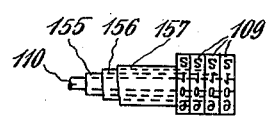

E. JANIK.
CASH CONTROLLING AND REGISTERING AND CHANGE RETURNING APPARATUS.
APPLICATION FILED SEPT. 22, 1908.
952,526.
Patented Mar. 22, 1910.
8 SHEETS—SHEET 8.
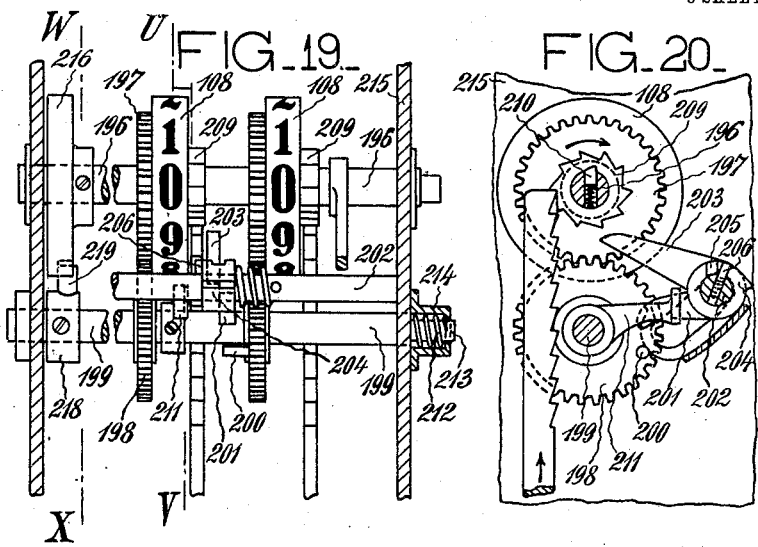
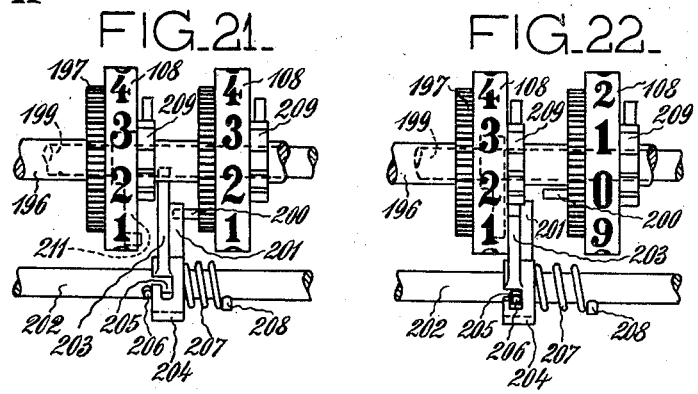
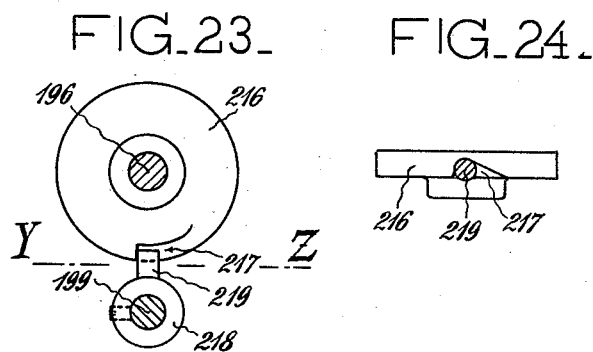
WITNESSES:
W. H. Berrigan
Alfred R. Anderson
INVENTOR.
EDUARD JANIK,
by F. van Oldenneel
Attorney.

UNITED STATES PATENT OFFICE.

EDUARD JANIK, OF LEMBERG, AUSTRIA-HUNGARY.

CASH CONTROLLING AND REGISTERING AND CHANGE-RETURNING APPARATUS.

952,526.  Specification of Letters Patent. Patented Mar. 22, 1910.

Application filed September 22, 1908. Serial No. 454,243.

*To all whom it may concern:*

Be it known that I, EDUARD JANIK, a subject of the Emperor of Austria-Hungary, residing at 2 Maistrasse, Lemberg, Galicia, in the Empire of Austria-Hungary, have invented new and useful Improvements in Cash Controlling and Registering and Change-Returning Apparatus, of which the following is a specification.

My invention relates to improvements in cash controlling and registering and change returning apparatus in which the discharge of the coins of the change is effected by means of superposed slides at the bottoms of the coin magazines, which slides are so controlled by ejectors that in proportion to the vertical adjustment of any ejector one or more of the superposed slides are actuated for ejecting one or more coins from the respective magazine. The vertical adjustment of the ejectors is effected by means of notched disks which are disposed either singly or in groups on a shaft and are turned forward in one direction according to the amounts paid in and are turned in the opposite direction according to the price to be paid. The turning of the notched disks forward and rearward is positively effected by the crank of the apparatus, couplings being inserted between the crank and the notched disks or groups of notched disks and working in both directions. The turn of the notched disks or groups of notched disks is each time limited by stopping levers meeting the ends of depressed keys of two sets of keys, one set being for the amount paid in and the other set for the price to be paid and adapted to effect the disengagement of the above mentioned couplings, which couplings are constantly reëngaged during the return of the notched disks or groups of notched disks to their initial position.

The improvements according to my invention consist of simplifications of sundry devices, whereby the costs of the manufacture are reduced, and a greater safety in the operation of the apparatus is obtained.

I will now proceed to describe my invention with reference to the accompanying drawings, in which—

Figure 16:
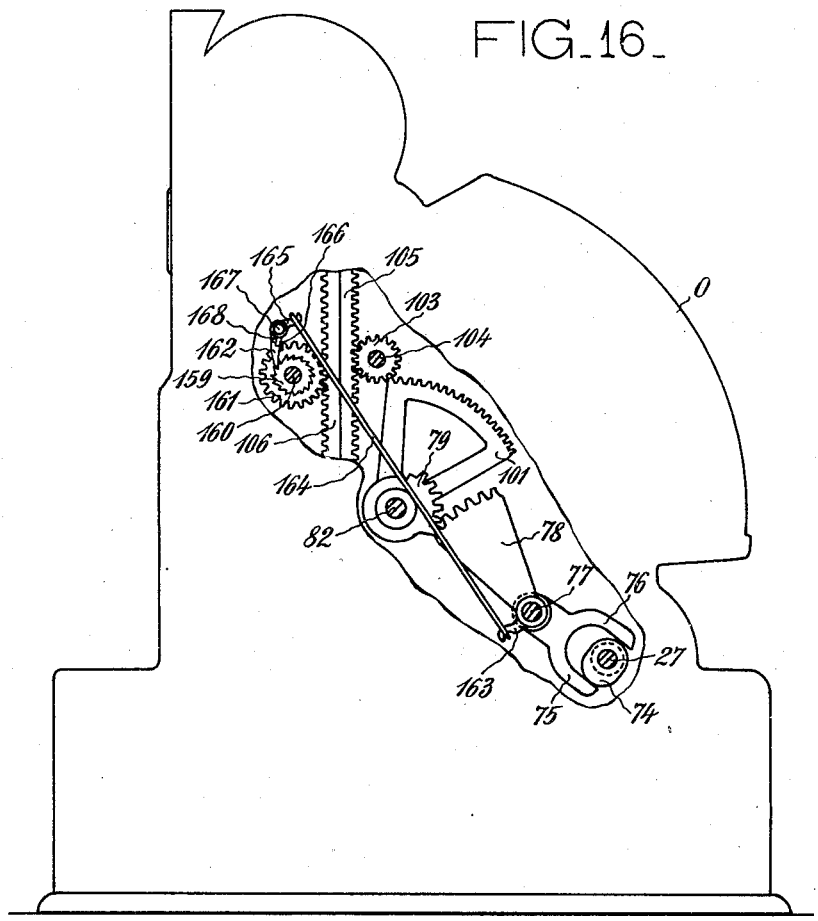

Figure 1 is a vertical cross section through the improved apparatus on the line A—B in Fig. 2, Fig. 2 is a horizontal section through the same on the broken line C—D in Fig. 1, certain parts on the right side being omitted, Fig. 3 is a vertical cross section through the upper part of the same on the broken line E—F in Fig. 7, Fig. 4 is a similar cross section through the broken line G—H in Fig. 7, Fig. 5 is similar to Fig. 3 and shows a locking device, Fig. 6 is a plan of parts shown in Fig. 5, Fig. 7 is a horizontal section through a part of the apparatus on the line I—J in Fig. 1, Fig. 8 is a vertical section through the driving gear on the line K—L in Fig. 7, Fig. 9 is a perspective view of two parallel horizontal shafts with several groups of notched disks and couplings respectively on them, certain gear wheels being omitted for the sake of clearness, Fig. 10 is a vertical section through the line M—N in Fig. 12, Fig. 11 is a similar section through the line O—P in Fig. 12, in which certain parts occupy other positions, Fig. 12 is a part out of Fig. 2 and shows parts illustrated at Fig. 9, Fig. 13 is a part out of Fig. 1 and shows parts for transmitting the adjustment of certain parts in accordance with the amounts paid to the counting and showing wheels, Fig. 14 is a horizontal section through the line Q—R in Fig. 13, Fig. 15 is a similar view and shows parts in other positions, Fig. 16 is a left end view of the apparatus, a part of the walls being cut out to show a transmission of the amounts adjusted to the showing and counting wheels, the registering mechanism being omitted, Fig. 17 is a vertical section through the line S—T in Fig. 2 and shows the recording mechanism, Fig. 18 is an elevation of the printing wheels of this mechanism, Fig. 19 is a front view on an enlarged scale of the mechanism for feeding the tens counting wheels, an intermediate part being omitted, Fig. 20 is a vertical section through the line U—V in Fig. 19, seen from left to right, Fig. 21 is a plan of a part of Fig. 19, Fig. 22 is a similar view, in which a certain part occupies another position, Fig. 23 is a vertical section through the line W—X in Fig. 19, seen from right to left, and Fig. 24 is a horizontal section through the line Y—Z in Fig. 23, seen from below.

Similar characters of reference refer to similar parts throughout the several views.

The apparatus comprises within a suitable casing O a series of vertical coin magazines $8^a$ to $11^b$ in Fig. 2, each of which is destined for a certain kind of coins. In Fig. 2 the coins are assumed to be those of the German currency, as will be described later on. All the various magazines $8^a$ to $11^b$ are shown as alike in diameter for the sake of simpleness, while in reality they are different in diameter. Loose on a horizontal shaft 16 fastened in the casing 0 are as many parallel and horizontal adjusting levers 15, 15, as there are coin magazines $8^a$ to $11^b$, and are vertically turnable in their planes. Each adjusting lever 15 has movable on it an ejector 17 provided with two lateral pins 19, 19, which latter engage (see Fig. 1) in vertical slots of two bearings 20, 20 fastened on a horizontal bar 21. This bar 21 is rigidly connected with a second parallel to it by means of two side parts 23 and 23', all these parts forming a frame which is horizontally guided, since two opposite lugs 24, 24 fastened on the inner side walls of the casing 0 engage in horizontal slots 25 of the side parts 23, 23'. The latter are formed in one piece with two short racks 26 and 26' (Fig. 2). Two toothed segments 28, 28 fastened on a horizontal shaft 27 turnable in the casing 0 can engage in the racks 26 and 26' for moving the frame 21, 22, 23, 23' with the series of ejectors 17, 17 to the rear and again to the front. Several superposed slides 6, 6 (Fig. 1) each having a thickness like that of the respective coins are provided at the bottom of each coin magazine $8^a$ to $11^b$ and are adapted to eject the coins in front of them from the magazine to conducting channels 183 formed by bent chutes 182. In Fig. 1 only two superposed slides 6 are shown, but it will be understood that their number may be increased. Each ejector 17 has a nose 18 which is adapted to strike one or several of the superposed slides 6 and to push them for ejecting the coins. Normally the noses 18 of all ejectors are beneath the lowermost slides 6 as shown in Fig. 1, but when the adjusting lever 15 is more or less turned upward the ejector 17 will strike with its nose one or more of the slides 6 and push it to cause discharge of one coin or to cause discharge of several coins forward on the frame 21, 22, 23, 23' being moved to the rear. The raising of every adjusting lever 15 is effected by means of a curved arm 39 which acts upon a leaf spring 40 fastened on the lever 15 and is made in one piece with a toothed segment 38, these two parts rocking on a shaft. The toothed segment 38 meshes (Fig. 1) with another one 37, which rocks on a shaft and is controlled by means of its rear arm from a cam 36 fastened on the shaft 27.

Above the series of adjusting levers 15 a horizontal shaft 7 (Figs. 1, 3 and 4) is mounted in the casing 0 to turn and on this shaft 7 a series of notched disks $2^a$, $2^b$, $2^c$, $3^a$, $3^b$, . . . (see also Fig. 9) is disposed which serve for limiting the upward turns of the corresponding adjusting levers 15. These notched disks are disposed in groups and the notched disks of each group are fastened on a separate hollow shaft 49, which is loose on the shaft 7 and is prevented from endwise motion. The number of the notched disks in each group corresponds to that of the kinds of coins for certain values. For example in the German currency a first group of three notched disks $2^a$, $2^b$, $2^c$, is disposed for the units of pfennigs, a second group of two notched disks $3^a$ and $3^b$ is disposed for the tens of pfennigs; a third group of three notched disks $4^a$, $4^b$, $4^c$ is disposed for the units of marks; and a fourth group of two notched disks $5^a$, $5^b$ is disposed for the tens of marks.

The notched disk $2^a$ corresponds to the coin magazine $8^a$ for the one pfennig pieces (1 pf.), the notched disk $2^b$ in Fig. 2 to that $8^b$ for the two pfennig pieces (2 pf.), the notched disk $2^c$ to that $8^c$ for the five pfennig pieces (5 pf.), the notched disk $3^a$ to the coin magazine $9^a$ for the ten pfennig pieces (10 pf.), the notched disk $3^b$ to the magazine $9^b$ for the fifty pfennigs (50 pf.), the notched disk $4^a$ to the magazine $10^a$ for the one mark pieces (1 m.), the notched disk $4^b$ to the magazine $10^b$ for the two mark pieces (2 m.), the notched disk $4^c$ to the magazine $10^c$ for the five mark pieces (5 m.), the notched disk $5^a$ to the magazine $11^a$ for the ten mark pieces (10 m.), and at last the notched disk $5^b$ to the magazine $11^b$ for the twenty mark pieces (20 m.).

Beside each single notched disk 3, 4, 5 a second disk 12, 13, 14 is fastened on the hollow shaft 49 (Figs. 1, 2, 9 and 12). The latter disks are severally displaced to the former notched disks by one pitch for tens and this in such a manner, that the notched disks 12, 13, 14 represent values reduced by "one" against those of the disks 3, 4, 5 after the latter have been adjusted.

Each of the single notched disks $2^a$, $2^b$, $2^c$ is directly above the corresponding adjusting lever 15 and the pin 29 (Figs. 1, 10 and 11) on the latter is adapted to either touch the periphery or engage in any of the notches of the disk, the depth of the notches being so proportioned as to permit the ejector 17 to strike with its nose 18 one or more of the slides 6. When the pin 29 touches the periphery of the notched disk and the corresponding cam 36, by movement of the parts 37, 38, 39 and 40 presses the adjusting lever 15 upward, the latter will be prevented from turning, since no play is permitted to it and the spring 40 is simply bent. When the frame 21, 22, 23, 23' is pushed to the rear (to the left in Fig. 1) by the toothed segments 28, 28 engaging in its racks 26 and 26', the ejector 17 will simply slide on the adjusting lever 15, while its nose 18 can not strike any of the slides 6. On the contrary, when any pin 29 can engage in some notch of the notched disk $2^a$ or . . . and the corresponding cam 36, by moving the parts 37, 38, 39, 40 presses the adjusting lever 15 upward, the latter will be turned upward as far as is permitted by the depth of the said notch, and when the frame 21, 22, 23, 23' is pushed to the rear, the ejector 17 sliding on the adjusting lever 15 will strike with its nose 18 one or more of the superposed slides 6 and push the same for ejecting the corresponding number of coins from the magazine.

Each pair of notched disks 3, 12 or 4, 13 or 5, 14 is disposed on both sides of the vertical plane of the adjusting lever 15 and the pin 29 of the lever 15 is not disposed direct on it but on the long arm 30 of a bell-crank lever 30, 32, which horizontally rocks around a pin 31 on the lever 15 (Figs. 1, 2, 10, 11 and 12). The short arm 32 of the said bell-crank lever has a slot 33 in which engages a radial pin 34 on a hollow shaft 35 rocking on a shaft 41 fastened in the casing 0 parallel to the shaft 7. For each group of notched disks 3, 4 and 5 there is a special hollow shaft 35 with a separate pin 34. All the hollow shafts 35, 35 are prevented from longitudinally shifting and each of them has at one end an arm 42 (Figs. 9 to 12) which engages with its pin 43 beneath an arm 45 loose on the shaft 41. Each arm 45 is provided with a lug 46 in which is guided the front end of a slotted bolt 47, so that the latter is prevented from turning on the shaft 41 and is only permitted to shift in the direction of its length, the amount of this shifting being limited by its central slot 44 (Fig. 1). The rear end of the bolt 47 normally engages in a notch 48 of a disk 50 fastened on any one of the hollow shafts 49, 49 and carries a lateral pin 51 (Fig. 12). A helical spring 52 surrounding the front end of the bolt 47 and bearing against the lug 46 presses the rear end of the bolt 47 against the periphery of the disk 50 or into the notch 48 of the latter. The lugs 46 of all the arms 45 normally rest on a horizontal rail 57 fastened in the casing 0 and are downward pressed by helical springs 55, which connect pins 56 on the lugs 46 with pins 58 on the rail 57. Each hollow shaft 35 has at the other end facing the bolt 47 on the arm 45 between it and the preceding hollow shaft an arm 53 approximately parallel to the rear end of the bolt 47. This arm 53 has a lateral pin 54, which engages beneath the lateral pin 51 on the bolt 47. When for instance one mark has been paid in and the price to be paid is five pfennigs, of course a change of 95 pfennigs will have to be returned. For this purpose the group of notched disks $4^a$, $4^b$, $4^c$ is first turned in the direction of the arrow in Fig. 10, so that the bolt 47 belonging to this group gets out of the notch 48 and is pushed outward by the disk 50 against the tension of its spring
52. Thereby the lateral pin 51 on the bolt 47 is moved out of the path of the opposite pin 54 on the arm 53 of the hollow shaft 35 for the next higher group of notched disks, that is the group for the tens of marks. Then during the following adjustment of the parts by the keys 59 (Figs. 3 and 5) for the amount paid in the group of parts for the units of pfennigs can not produce any rotation of the said hollow shaft 35 of the group for the tens of marks and so the hollow shafts 35 of the groups for the higher values will remain at rest. In other words all the hollow shafts 35 for the tens of marks and upward are disengaged.

When now in a manner to be described later on the group of notched disks for the units of pfennigs, that is $2^a$, $2^b$, $2^c$, is turned in the direction of the arrow in Fig. 11 by depressing the keys 60 for the price to be paid, the rear end of the bolt 47 will be depressed (see Fig. 11) by the radial face of the notch 48 in the disk 50 against the tension of the helical spring 55 and turned around the shaft 41, so that the lateral pin 51 on this bolt 47 will take along with it the pin 54 on the arm 53 of the first hollow shaft 35 destined for the tens of pfennigs, so that the radial pins 34 on this hollow shaft 35 will actuate the short arms of the bell-crank levers 30, 32 for shifting the pins 29, 29 from the notched disks $3^a$, $3^b$ to those $12^a$, $12^b$ of the second group (for the tens of pfennigs). Thereby this group is turned back by one ten, that is to say its initial position is changed into one which corresponds to 9 tens.

In order to effect the correct return of the change also the group of notched disks for the units of marks requires to be turned back by one tenth through which it had been turned forward by the depressing of the key 59, so as to return it to its initial position. This is effected by the arm 42 of the first hollow shaft 35 engaging beneath the neighboring arm 45 and thereby turning its bolt 47 and therewith also the second hollow shaft 35 for the tens of marks, whereby the two hollow shafts 35, 35 are coupled. During this turn the bolt 47 is not shifted at all, since the curved face of the notch 48 is concentric with the axis around which the bolt 47 rocks. In consequence of this its pin 51 remains in engagement with that 54 on the arm 53 of the hollow shaft 35 for the units of marks group of notched disks and this second hollow shaft is simultaneously turned with the first hollow shaft 35. As all the pins 29 mounted on the bell-crank levers 30, 32 and shifted beneath the notched disks $13^a$, $13^b$, $13^c$ are in contact with the unnotched portions of the latter, they will prevent their adjusting levers 15, 15 from turning upward, so that only the respective adjusting levers 15, 15 for the coins of lower value are permitted by the notches in the notched disks 2ª or 2ᵇ or 2ᶜ or 12ª or 12ᵇ or in any two or three or more of them, as the case may be, to raise under the action of their leaf springs 40 and curved arms 39, whereupon the frame 21, 22, 23, 23′ pushed to the rear will cause the raised ejectors 17 to eject with their noses 18 by means of the corresponding slides 6, 6 the respective coins from the magazines 8 or 9 or both.

On each hollow shaft 49 are fastened two pinions 84 (Figs. 2 and 3) and 102, (Figs. 2 and 4) which will be referred to later on. A horizontal shaft 82 is mounted to rock in the casing 0 above the shaft 7 and carries loose on it as many adjusting bows 87 (Figs. 1, 3 and 5) and as many adjusting bows 115 (Figs. 1 and 4) as there are hollow shafts 49 or groups of notched disks. There are also as many sets of keys 59 for the amounts paid in and as many sets of keys 60 the latter operating as hereinafter described for the prices to be paid. Each adjusting bow 87 has nine locks 88 (Figs. 6 and 7) of triangular section which are normally in line with the radially disposed spring-pressed keys 59 and can engage in notches 89 of the latter. The bow 87 has at its upper end a triangular notch 86 (Fig. 3), in which normally a pin on a spring-pressed bent lock 85 engages, so that it is thereby held in its normal position shown at Fig. 3. When in accordance with the amount paid in any key 59 is depressed in the direction of the arrow in Fig. 5, its end sliding on the inclined side of the appertaining lock 88 will by the latter push the adjusting bow 87 upward until the lock 88 snaps behind its end and engages in its notch 89, so that the bow 87 returns to its initial position under the action of the pin on the spring-pressed lock 85, which pin sliding down the inclined face of the notch 86 pushes the bow 87 downward. The end of any depressed key 59 serves for limiting the turn of a stopping lever 81 loose on the shaft 82 in a manner to be described later on. The lever 81 is rigidly connected with a toothed segment 83 which permanently meshes with the pinion 84 mentioned above. Each adjusting bow 115 (Fig. 4) has also nine locks 119 (Figs. 1, 4 and 6) of triangular section which are normally in line with the keys 60 and can engage in notches 120 of the latter. The bow 115 has at the lower end of its periphery a notch 117 in which a pin on a spring-pressed lock 116 engages, so that it is thereby held in its normal position shown at Fig. 4. When in accordance with the price to be paid any key 60 is depressed, its end sliding on the inclined side of the appertaining lock 119 will, by movement of the latter, push the adjusting bow 115 upward until the lock 119 snaps behind its end and engages in the notch 120, so that the bow 115 returns to its initial position under the action of the pin on the spring-pressed lock 116 sliding down the one inclined face of the notch 117. On one side of the nave of each adjusting bow 115 two opposite toothed segments 100 and 101 rigidly connected together and with a stopping lever 80 are mounted loose on the shaft 82 and the one segment 100 can mesh with the pinion 102 mentioned above on the hollow shaft 35 on the shaft 7 and the other segment 101 can mesh with a pinion 103 (Figs. 1 and 16) loose on a horizontal shaft 104. The pinion 103 meshes with a vertical rack 105 (Figs. 1, 13, 15 and 16), which meshes with a second pinion 197 loose on the horizontal shaft 196 and rigidly connected with a counting wheel 108 as in a known construction. The wheel 108 has on its periphery numerals (see Figs. 19 and 20) any one of which can appear in a window of the casing (Fig. 1). The end of any depressed key 60 serves for limiting in a manner to be described later on the turn of a stopping lever 80 and thereby the turn of the counting wheel 108.

On the right side of the casing is fastened a circular box O¹ (Figs. 1, 7 and 8), in the wall of which a pin 62 is mounted to turn, which carries a crank 61 outside of the machine and a pinion 63 within the casing. The pinion 63 constantly meshes with a gear wheel 64 of double its diameter fastened on a shaft 66 which is mounted to turn and carries a smaller wheel 65 which is toothed only on half its periphery, so that it can mesh with two gear wheels 67 and 68 (indicated by dotted circles in Fig. 8) on different shafts only one after the other during one complete revolution of the gear wheel 64. The wheel 65 is made so large that the two gear wheels 67 and 68 driven consecutively by it make each nearly a complete revolution. The gear wheel 67 is rigidly connected with a larger gear wheel 69 and the gear wheel 68 with the gear wheel 70. The gear wheel 69 constantly meshes with a gear wheel 71 and the gear wheel 70 constantly meshes with a gear wheel 72. Also the two gear wheels 71 and 72 mesh with one another and one 72 of them meshes with a gear wheel 73 fastened on the shaft 27 mentioned above. All the gear wheels 69, 70, 71, 72 and 73 are made alike. It will be now understood, that when the crank 61 is turned twice in the direction of the arrow II in Fig. 8, first the wheel 65 will turn the gear wheel 67 and by the several gear wheels 69, 71, 72 and 73 the shaft 27 in the direction of the arrow I in Fig. 8 during the first complete revolution of the crank 61, and afterward the wheel 65 will turn the gear wheel 68 and thereby the shaft 27 in the opposite direction during the second complete revolution of the crank 61. On the completion of its second revolution the crank 61 requires to be stopped. For this purpose the gear wheel 64 has fastened on it a tooth 132 (shown dotted in Fig. 8) which can strike the long arm 131 of a two-armed lever 130, 131 rocking on the pin 134' on a lever 134 that is loose on a pin 135 and is provided (Fig. 8) with two stops 133 and 140 for limiting the turn of the short arm 130 of the two-armed lever 130, 131. Loose on the pin 62 of the crank 61 is a ratchet wheel 136 provided with a slot concentric with its axis and in this slot engages a pin fastened on the pinion 63, so that the turn of the ratchet wheel 136 in relation to the pinion 63 is limited. Loose on the pin 134' is a pawl 137 engaging in the ratchet wheel 136 and pressed thereon by a leaf spring 138 which is fastened on some projection and bears against an arm 139 of the pawl 137. Before turning the crank 61 it requires to be first released and therefore it is turned a little rearward, that is in a direction opposite to the arrow II, so as to push by the pawl 137 the pin 134' to the left in Fig. 8 against the tension of the leaf spring 138. Thereby the lever 134 is turned to the left and the long arm 131 is withdrawn from the tooth 132, its short arm 130 bearing against the stop 133, so that the arm 131 will drop behind the tooth 132 and its short arm 130 will bear against the other stop 140. The tooth 132 being thus released, the crank 61 can now be turned forward in the direction of the arrow II in Fig. 8 and twice, so that the gear wheel 64 with the wheel 65 makes one complete revolution until the tooth 132 strikes the long arm 131 and presses its short arm 130 against the stop 133. Thereby the crank 61 is prevented from further turning.

On the shaft 27 is fastened a single eccentric 74 (Figs. 1 and 3) for actuating all the notched disks 2ᵃ to 14ᵇ in the following manner. A horizontal shaft 77 (Figs. 1, 3, 4, 5 and 7) parallel to the shaft 27 is mounted in the casing 0 to rock and has fastened on it a fork 75, 76 and as many toothed segments 78, as there are adjusting bows 87. In the fork 75, 76 engages the eccentric 74 and the several toothed segments 78 mesh with small toothed segments 79 which are loose on the shaft 82 and are disposed between the several adjusting bows 87 and the stopping levers 81 mentioned above. Each stopping lever 81 has (see especially Fig. 3) guided on it a bolt 90 which is pressed by a helical spring 97 on the nave of the toothed segment 79 and normally engages with its beveled-off end in a notch 91 in the said nave. Thereby the stopping lever 81 is normally coupled with the toothed segment 79. On the free end of the stopping lever 81 a two-armed lever 92, 93 is mounted to rock, its turn being limited by a pin 95 on the lever 81 engaging in its slot 94. The lower arm 92 of the lever 92, 93 normally engages the upper end of the bolt 90 and serves for locking the latter. A leaf spring 96 fastened on the stopping lever 81 and bearing on the upper arm 93 serves for holding the lever 92, 93 in its normal position shown at Fig. 3. The upper end of the arm 93 bears on the lower end of the spring-pressed bent lock 85 mentioned above. It will be understood, that by depressing any key 59 the bow 87 is turned a little upward in the direction of the arrow in Fig. 3, so that the inclined face of its notch 86 withdraws the lock 85 from the upper arm 93, whereupon the latter engages beneath it, since the lever 81 is permitted to slightly turn to the right in Fig. 3 by the play in the teeth of the two segments 78 and 79. When the crank 61 is turned, the shaft 27 is in the manner described above first turned once in the direction of the arrow I in Fig. 3, so that the eccentric 74 by the parts 75, 76, 77, 78, 79 causes all the stopping levers 81 first to move downward and afterward to move upward. For any set of keys 59 in which no key 59 has been depressed the stopping lever 81 will remain coupled with the toothed segment 79. For any set of keys 59 in which some key 59 has been depressed the upper arm 93 on the stopping lever 81 will during the downward turn of the latter strike the end of the depressed key 59 (Fig. 5) and will be turned a little, so that its lower arm 92 will release the bolt 90, which is now permitted to move away from the shaft 82 while sliding with its beveled-off end on the inclined face of the notch 91 and perhaps on the periphery of the nave, as the case may be. Thereby the stopping lever 81 is disconnected from its toothed segment 79, so that it stops, while the toothed segment 79 further turns. In this manner the turn of the stopping lever 81 and thereby that of the toothed segment 83 rigidly connected with it is limited in correspondence with the amount paid in. Thereby the pinion 84 and with it the hollow shaft 35 with the notched disks 2, 3, . . . will be turned through a certain angle. During the upward turn of the toothed segment 79 the beveled-off end of the bolt 90 will first slide on its nave until it engages in its notch 91 under the action of the helical spring 97, whereby the stopping lever 81 is again coupled with the toothed segment 79 and is returned to its initial position shown at Fig. 3, its upper arm 93 pushing the spring-pressed lock 85 upward until it snaps behind the lower end of the latter. During the second revolution of the crank 61 the stopping lever 81 is prevented from shifting, so that the beveled-off end of its bolt 90 simply slides on the nave of the toothed segment 79 in both directions until it again engages in the notch 91. In consequence of this the notched disks will not be actuated from the toothed segment 79. The notched segment 83 is made so large as to remain in permanent engagement with the pinion 84, so that during the upward turn of the stopping lever 81 also the pinion 84 and with it the respective group of notched disks is returned to the initial position.

Fastened on the shaft 66 (Figs. 7 and 8) is a toothed segment 98, which can periodically mesh with another toothed segment 99 fastened on the shaft 82 (Fig. 4). The naves of the several stopping levers 80 (Fig. 4) already mentioned above have each a cut 111 extending over about one fourth of its circumference. In this cut engages a pin 112 which is fastened in the shaft 82 and is on its free end beveled off, so that it can bear on the beveled-off end of a bolt 113 guided in the stopping lever 80 and pressed outward by a helical spring 114. On the free end of the stopping lever 80 a lock 118 is mounted to rock, which is adapted to snap behind the external end of the bolt 113 for securing the latter, after it has been moved toward the shaft 82, and a spring 126 is provided for pressing the lock 118 into its normal position shown at Fig. 4. In this position the lock 118 engages beneath the beveled-off end of the spring-pressed lock 116. A stop 121 is provided on the stopping lever 80 for limiting the turn of the lock 118. When any key 60 is depressed, its internal end will in the manner described above push the adjusting bow 115 upward, so that the spring-pressed lock 116 is withdrawn from the lock 118 by its pin being pushed outward by the inclined face of the notch 117, whereupon it snaps beneath the external end of the lock 118, since the latter has so much slight play as to spring upward on being released. Loose on the shaft 77 are as many bell-crank levers 128, 129, (Fig. 4) as there are adjusting bows 119. On the external end of each bolt 113 is a lateral pin 130 on which the free end of the corresponding arm 129 can bear. On the shaft 27 are fastened cams 127 which can act upon the lower arms 128 of the bell-crank levers 128, 129 for so turning the latter as to push the spring-pressed bolts 113 toward the shaft 82, until the spring-pressed locks 118 snap behind the external ends of the bolts 113 and secure the latter. Thereby the stopping lever 80 is coupled with the shaft 82. The said movement of the parts 128, 129, 113 takes place at the end of every complete revolution of the shaft 27.

A single cam 122 is fastened on the shaft 27 and is adapted to actuate the arm 123 of a bell-crank lever 123, 124 loose on the shaft 77, while the other arm 124 forms a toothed segment which constantly meshes with another toothed segment 125 fastened on the shaft 82.

After depressing some key 60 in any set of keys 60 in accordance with the price to be paid out, the internal end of this depressed key 60 will engage in the path of the respective lock 118 on the stopping lever 80, so that at the commencement of the first revolution of the crank 61 the toothed segment 98 (Figs. 8 and 4) engaging in the other one 99 will turn the shaft 82 and by its pin 112 the stopping lever 80 upward in the direction of the arrow in Fig. 4. On the lock 118 striking the end of the depressed key 60, it will be thereby slightly turned to release its bolt 113, which under the action of its helical spring 114 will recoil outward and thus disconnect the stopping lever 80 from the shaft 82. The stopping lever 80 is stopped, since its lock 118 bears on the one hand against the end of the depressed key 60 and on the other hand against the stop 121 on the lever. The turn thus limited of the stopping lever 80 is transmitted through its upper toothed segment to the pinion 103 for raising the rack 105 through a corresponding distance and for turning the gear wheel 197 and thereby the counting wheel 108, so that the respective numeral on the latter will be visible in the window (see Fig. 1). At the same time the said turn of the stopping lever 80 is transmitted through its lower toothed segment 100 to the pinion 102 for turning the notched disks of the respective group in the direction of the arrow in Fig. 11. Then one or several of these notched disks will present notches to the pins 29 for permitting the corresponding adjusting levers 15, 15 to turn upward as soon as they are pressed upward by their springs 40 and curved arms 39. Meanwhile the shaft 82 has continued its quarter revolution until its pin 112 is about vertical without touching the left end of the cut 111 in the nave of the stopping lever 80.

In all sets of keys 60 in which no key has been depressed the stopping levers 80 will be slightly turned upward by the corresponding pins 112 on the shaft 82 until their locks 118 are turned back by the spring-pressed locks 116 and release their bolts 113 whereupon the latter recoil outward thus disconnecting the stopping levers 80 from the shaft 82, so that the stopping levers 80 remain in their normal position shown at Fig. 4, while the pins 112 on the shaft 82 merely turn upward until they strike the left ends of the cuts 111 or nearly so and stop. During the second half of the first revolution of the shaft 27 in the direction of the arrow I in Fig. 4 the cam 122 acts upon the arm 123 of the bell-crank lever 123, 124 and turns by means of the two toothed segments 124 and 125 the shaft 82 back into its initial position, so that by its pins 112 all the stopping levers 80 previously turned upward are with their toothed segments 100 and 101 returned to their initial position. Shortly before the end of the first revolution of the shaft 27 the cams 127 actuate the bell-crank levers 128, 129 for pushing all the bolts 113 toward the shaft 82 and thus coupling all the stopping levers 80 with the shaft 82.

The several coins of the amount paid in are assorted and inserted in special vertical channels 184, (Fig. 1) of which preferably one is provided for each sort of coins on the rear of the apparatus. According to my invention the coins are made visible to the buyer through one window 185 for each channel 184. The coins are preliminarily held in this position by rails 186 affixed on the lower arms 187 of two-armed levers 187, 188 rocking on a shaft 189 and normally pressed against the wall of the casing 0 by helical springs surrounding the shaft 189. Several two-armed levers 192 rocking on the shaft 191 of the indicating wheels 107 are provided, so that by depressing their keys 190 their rear arms will press on the upper arms 188 for withdrawing the rails 186 from the channels 184 and thus allowing the coins to drop through separate bent channels 193 either at once into the corresponding magazines 8$^a$ to 11$^b$ of the change returning mechanism or, if these magazines are full, through further channels 194 into convenient compartments of the drawer 220.

The amount paid in is in a known manner to be indicated by the counting wheels 108 mentioned above and by the indicating wheels 107. The transmission of the movement of the crank 61 to the counting wheels 108 by means of the racks 105 has already been described above. For the transmission of the said movement to the indicating wheels 108 a second series of racks 106 is employed, each of these racks being adapted to be coupled with the corresponding rack 105 and to be disconnected therefrom.

The racks 105 are severally raised in the above described manner for turning the counting wheels 108 and are lowered again. The other racks 106 are severally raised by coupling them with the former racks 105 for turning the indicating wheels 107 and the type wheels 109 (Fig. 18) but they are to remain in their adjusted position to enable the registering mechanism to be described hereinafter to print the amounts paid in on the registering paper strip. For this reason the racks 106 require to be temporarily disconnected from the racks 105, before the latter descend as usual. The two series of racks 105 and 106 as ordinarily constructed are liable to inadvertent displacement with regard to one another by the action of neighboring machine parts. According to my invention special means are provided for insuring the correct coupling of the two series of racks as follows: Each rack 105 is provided with a rocking lock 145 which is adapted to engage in a recess 146 in the corresponding rack 106 and is adapted to be withdrawn from the said recess 146 (Fig. 13) at the end of the revolution of the shaft 27, whereby the rack 106 is released. For example a shaft 143 (Figs. 1, 13, 14 and 15) parallel to the rack 105 is mounted to turn with its pivots 142 in suitable lugs on the rack 105 and carries a wing 144 and the said lock 145. The wing 144 is on its side facing the shaft 82 provided with a series of teeth 147 and the lock 145 is adapted to normally engage in the recess 146 of the rack 106, a spring 148 pressing on an upper projection 149 of the wing 144 serving for holding the lock 145 in engagement with the rack 106. A lever 150 loose on the shaft 82 is provided for each rack 105 and is provided with two stops 151 and 152, between which a pin 153 is fastened on the shaft 82.

For the normal position of the rack 105 with the lock 145 shown at Fig. 1 the lever 150 occupies its upper position as shown, in which the pin 153 on the shaft 82 bears on its right stop 152, so that it permits the shaft 143 with the wing 144 to freely move, and the lock 145 on the rack 105 can engage in the recess 146 of the other rack 106 under the action of the spring 148 (Fig. 14). At the end of the turn of the shaft 82 in the direction of the arrow in Fig. 4 its radial pin 153 strikes the other stop 151 and thereby turns the lever 150 downward (Figs. 13 and 15), so that the free end of the latter pushes the wing 144 to the left, whereby the lock 145 is turned out of engagement with the recess 146 to release the rack 105. The free end of the lever 150 engages in any of the tooth spaces of the wing 144, so that the lever 150 is thereby locked and therewith also the shaft 143 and the lock 145, so that the rack 105 is supported in the same position as the other rack 106, although the shaft 82 is now liberated by the two toothed segments 98 and 99 coming out of gear with one another. After the registering to be described later on the shaft 82 is turned in the opposite direction as described above, so that its pin 153 strikes the other stop 152 and thereby returns the lever 150 to its initial position. The lever 150 thus releases the wing 144 and permits the lock 145 to reëngage in the recess 146, whereby the two racks 105 and 106 are again coupled before they are permitted to descend.

The racks 106 (Fig. 1) mesh with gear wheels 154 fastened partly on a horizontal shaft 110 and partly on hollow shafts 155, 156 and 157 loose on the shaft 110 and on one another, all of these shafts carrying each at their left end a type wheel 109, 109, see Fig. 18, within a special casing 0$^2$. The racks 106 moreover mesh with the known driving gear wheels 158 of the showing wheels 107, and with gear wheels 161 loose on a third shaft 160. After the racks 106 have been raised in proportion with the amount paid in and the showing wheels 108 have been turned into their proper position for showing the said amount, the racks 106 require to be locked for registering. This is effected by means of ratchet wheels 159 rigidly connected with the gear wheels 161 (Figs. 1 and 16), and of pawls 162 loose on a shaft 167 and pressed by springs (not shown) on the ratchet wheels. All the pawls 162 can be withdrawn from the ratchet wheels 161 at the proper moment by means of arms 163 rigidly connected with the toothed segments 78, connecting rods 164 and bell-crank levers 165, 166 loose on the shaft 167 and adapted to strike with their lower arms 166 against pins 168 on the pawls 162.

I do not further describe the mechanism for moving the indicating wheels 107, as it is immaterial to my invention and may be of any known construction.

The recording mechanism of a known construction is illustrated at Figs. 17 and 18. During the second revolution of the crank 61 the shaft 27 is rotated back, that is in a direction opposite to that of the arrow in Fig. 17, so that an arm 173 fastened on it is adapted to depress the lower arm 172 of a bell-crank lever 171, 172 for striking the upper arm 171 of the same with the guiding roller 170 and the paper strip 169 against the type wheels 109 for producing the impression. The paper strip 169 is unwound from the roll loose on the end of the shaft 82 and is wound on the other roll 178, it being fed forward by the arm 173 striking the arm 174 of a two-armed lever 174, 175, so that a spring-pressed pawl 176 pivotally connected with the other arm 175 is pulled for feeding a ratchet wheel 177 one tooth forward. From an examination of Fig. 17 it will be clear that during the forward revolution of the shaft 27 in the direction of the arrow its arm 173 can neither feed the paper strip 169 nor effect any printing.

Hitherto the cash controlling and registering apparatus constructed similar to the one described above presented the defect, that both sets of keys 59 and 60 could be actuated independently of each other, so that it is possible directly after depressing the keys 59 for the amount paid in to turn the crank 61 without first depressing the keys 60 for the price to be paid and thereby to obtain the return of the whole amount paid in. As the controlling mechanism is only actuated, if the keys 60 of the other set are depressed for the price to be paid, it follows, that in the above case no registering of the amount paid in takes place, so that the apparatus fails to control the operations. This defect is according to my invention avoided in the manner, that the keys 59 for the amount paid in are by a special device prevented from being depressed and that they are released only by depressing the keys 60 for the price to be paid. In consequence of this the parts for the amount paid in cannot be adjusted before the parts for the price to be paid have been adjusted. With this plan, however, it is necessary that the apparatus should permit the correction of errors committed by depressing wrong keys before the registering. According to my invention also a device for this purpose is provided as follows: Behind the upper ends of the adjusting bows 87 and 115 a horizontal shaft 169' is mounted in the casing 0 to turn and is provided with two series of pins 170' and 173' (Figs. 3 and 4), which are set at right angles to one another. Each pin 170' faces a lateral pin 171' on the upper end of the corresponding bow 87 in such a manner that this bow is prevented from turning the shaft 109' and is prevented from shifting. Each pin 173' on the contrary is normally in contact with a pin 172' provided on the upper end of the corresponding adjusting bow 115, so that by depressing some key 60 and thereby turning the bow 115 upward in the direction of the arrow in Fig. 4 the pin 172' on the bow 115 turns the pin 173' and therewith the shaft 169' with all of its pins 170' and 173'. Thereby all the bows 87 are released and permit the depressing of the keys 59 for adjusting the parts of the machine for the price to be paid.

Should any wrong key 59 or 60 have been depressed, the corresponding adjusting bow 87 or 115 will require to be turned back for releasing the depressed key so as to permit the right key to be depressed. For the purpose all the adjusting bows 87 and 115 are made to normally rest on cams 174' (Fig. 5) which are turnable on a horizontal shaft 175' and are each provided with a lateral pin 178'. The shaft carries an arm with a key 176' and a horizontal radial pin 177' for each cam 174', this pin 177' being adapted to actuate the lateral pin 178' of the cam 174'. When any wrong key should have been depressed by error, the operator need only depress the key 176' and thereby turn the shaft 175' and by its pins 177' to turn all the cams 174' upward for moving all the bows 87 and 115 upward, whereby all the depressed keys 59 and 60 are released, the locks 88 and 119 of the bows withdrawing from the notches 89 and 120 of the keys.

Any correction of the depressed keys must be finished before the crank 61 is turned. For this purpose a series of locks 179 (Fig. 5) is provided which are loose on the shaft 77 and work with disks 180 fastened on the shaft 27. Normally all the locks 179 engage in notches of the disks 180, so that their upper edges are clear from locking pins 181 fastened on the shaft 27. The moment, however, that the crank 61 is turned and thereby the shaft 27 is turned in the direction of the arrow in Fig. 5, all the locks 179 will get out of the notches of the disks 180 and will be raised by the peripheries of the latter into a position indicated by the dotted lines, so that they engage behind the locking pins 181 and prevent the key 176' from rocking the shaft 175'.

The last improvement according to my invention relates to the mechanism for feeding the counting wheels 108 for the tens of the values and consists of a simplification of the device for returning these counting wheels 108 and their feeding pawls to their initial position. The improved mechanism is illustrated at Figs. 19 to 24 inclusive.

In the known mechanism for feeding the tens counting wheels 108 the latter are mounted loose on the shaft 196 and the gear wheels 197 fastened on the counting wheels mesh with like gear wheels 198 loose on the shaft 199. The gear wheels 198 have lateral pins 200, which on the counting wheels 108 completing one revolution actuate arms 201 of feeding pawls 203 that are loose on the shaft 202. The nave 204 of each feeding pawl 203 has a bent slot 205, in which a radial pin 206 on the shaft 202 can engage. All the feeding pawls 203 normally occupy an initial position illustrated at Figs. 19 and 21, in which their naves 204 are pressed by helical springs 207 against the pins 206, the helical springs 207 bearing against pins 208 fastened on the shaft 202. Then the transfer pawls 203 are out of engagement with the ratchet wheels 209 fastened on the counting wheels 108, the pawls 203 being on a side of the ratchet wheels 209. At the moment that the counting wheel 108 with its gear wheel 197 completes one revolution, the pin 200 on the gear wheel 197 strikes the arm 201 and thereby turns the feeding pawl 203 upward, so that the mouth of the bent slot 205 registers with the radial pin 206, whereupon the helical spring 207 pushes the nave 204 to the left in Fig. 21 and thereby the pawl 203 into engagement with the ratchet wheel 209, the pin 206 engaging in the slot. After the pin 200 leaves the arm 201, the pawl 203 drops and thus feeds the ratchet wheel 209 with the following counting wheel 108 one tooth forward. The return of these counting wheels 108 to their initial position is according to my invention effected by turning once the shaft 196 in the corresponding direction. For returning the counting wheels 108 they are temporarily coupled with the shaft 196. For this purpose the nave of each counting wheel 108 or of one ratchet wheel 209 is provided with a triangular notch (Fig. 20), in which a spring-pressed bolt 210 in a cross hole in the shaft 196 can engage. The free end of this bolt 210 being beveled off, it will be understood, that during the rotation of the counting wheel 108 and ratchet wheel 209 in the direction of the arrow the bolt 210 will be depressed and get out of the notch, so that the counting wheel 108 can be turned through any angle in proportion to the numeral which it is to show in the window, the shaft 196 being stopped. When, however, for returning the counting wheels 108 the shaft 196 is turned in the direction of the arrow, the bolt 210 engaging at last in its notch will take along with it the counting wheel 108 or the ratchet wheel 209 therewith connected and thus return them to their initial position. In order to avoid any feeding during this return of the counting wheels 108 the effect of the transfer pawls 203 requires to be temporarily suspended, and this is according to my invention effected in the manner, that the shaft 199 is made to longitudinally shift, it being provided with arms 211, which are adapted to first turn the pawls 203 upward and afterward to push them to a side during the longitudinal shifting of the shaft 199. The shaft 199 is normally pressed to the left in Figs. 19 and 21 by a helical spring 212 surrounding its reduced end 213. The spring 212 is inclosed in a box 214 on the right end wall 215 of the casing 0 and bears on the one hand against the wall of this box and on the other hand against the shoulder of the shaft 199. On the shaft 196 is fastened a disk 216 (Figs. 23 and 24) close to the left side of the casing 0, and this disk 216 has a notch 217 with an inclined face. The shaft 199 is in any known manner prevented from turning and has fastened on it a disk 218 with a radial pin 219 (Figs. 23 and 24). This pin 219 slides on the periphery of the disk 216 until it suddenly engages in the recess 217 on the shaft 196 completing one revolution. The pin 219 serves at the same time for holding the shaft 196 in its normal position, in which the several feeding pawls 203 can engage in the ratchet wheels 209 in the manner described above. When, however, for returning the counting wheels 108 to their initial position the shaft 196 is in a known manner turned in the direction of the arrow in Fig. 20, the inclined face of the notch 217 in the disk 216 will push by the pin 219 the shaft 199 to the right in Figs. 19 and 21 for turning and pushing all the feeding pawls 203 to a side of their ratchet wheels 209. After the shaft 216 has completed its revolution the pin 219 reëngages in the notch 217 of its disk 216, so that the shaft 199 is returned to its initial position.

The improved cash controlling and registering and change returning apparatus may be varied in many respects without departing from the spirit of my invention.

I claim:

1. In a cash-registering and change-returning apparatus, groups of notched disks, rocking means 35, one for each group of disks, a pin, 34, projecting radially from one of said rocking means, an adjusting-lever, 15, a lever, 30, pivotally connected with the adjusting-lever, a lug, 29, carried by the lever 30, and having an arm, 32, provided with a slot wherein the pin 34 fits.

2. In a cash-registering and change-returning apparatus, adjusting levers, 15, a sliding frame having a gear rack, fork-shaped bearings, 19, one for each adjusting-lever, ejectors, 17, one for each said lever and slidably fitting a fork-shaped bearing, and slides in the path of movement of the ejectors.

3. In a cash-registering and change-returning mechanism, groups of notched disks, operating gears, 84, one for each group, toothed segments, 83, one for each gear and constantly meshing therewith, a toothed segment for driving a segment 83, a lever having a fork and also having a segment 78 meshing with segment 79, and an eccentric mounted on a shaft and fitting within the fork aforesaid.

4. In a cash-registering and change-returning mechanism, adjusting levers, showing wheels, type-wheels and counting-wheels, racks for operating said wheels and those for moving the counting-wheels arranged for operation by said adjusting levers, and means for coupling these racks with others, comprising a lock-lug, 145, on a rack 105, for engaging a recess, 146, of a rack 106, and a shaft 82 and connections controlled thereby, for moving said lock-lug from locking position.

5. In a cash-registering and change-returning mechanism, wheel-operating racks, a shaft, 143, on one rack, 106, and rotatable about an axis lengthwise of the latter, a lock-lug carried by said shaft, a wing on the last-named shaft, an adjacent rack, 106, having means for receiving the lock-lug, an arm, 150, on a shaft, 82, for normally holding the wing so as to have the lock-lug in engagement with rack 106, and for moving the engaged racks.

6. In a cash-registering and change-returning mechanism, adjusting bows, one for amounts paid in and the other for amounts paid out, keys, 59, and connections for operating the first-named bow, keys, 60, and connections for operating the other bow, stops normally preventing adjustment of said first-named bows, and connection whereby said second-named bows move the stops to permit of the first-named bows to be adjusted.

7. In a cash-registering and change-returning mechanism, an adjustable bow, a shaft, 175, a lock-pin, 181, therefor, a pushing disk, 180, and a locking arm, 179, movable by the disk into and out of the path of the pin, 181.

In testimony whereof I have signed my name to this specification in the presence of two subscribing witnesses.

EDUARD JANIK.

Witnesses:
  WLADIMIR JANIK,
  ROBERT W. HEINGARTNER.